United States Patent
Ball et al.

(10) Patent No.: US 7,382,745 B2
(45) Date of Patent: Jun. 3, 2008

(54) METHOD FOR ALLOCATING RADIO TECHNICAL RESOURCES FOR DATA TRANSMISSION IN A RADIO COMMUNICATION NETWORK

(75) Inventors: Carsten Ball, München (DE); Kolio Ivanov, München (DE); Robert Müllner, München (DE); Franz Treml, Dachau (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 355 days.

(21) Appl. No.: 10/541,707

(22) PCT Filed: Jan. 21, 2004

(86) PCT No.: PCT/EP2004/000466

§ 371 (c)(1),
(2), (4) Date: Jul. 8, 2005

(87) PCT Pub. No.: WO2004/077866

PCT Pub. Date: Sep. 10, 2004

(65) Prior Publication Data

US 2006/0077980 A1   Apr. 13, 2006

(30) Foreign Application Priority Data

Feb. 28, 2003   (DE) .................... 103 08 976
Feb. 28, 2003   (EP) .................... 03004530

(51) Int. Cl.
  *H04Q 7/00*   (2006.01)
(52) U.S. Cl. ............. 370/329; 370/338; 370/395.41; 455/450; 455/452.2
(58) Field of Classification Search ............... 370/329, 370/335, 318, 349, 338, 395.41; 455/450, 455/452.2
See application file for complete search history.

(56) References Cited

U.S. PATENT DOCUMENTS

| | | | |
|---|---|---|---|
| 6,038,223 A * | 3/2000 | Hansson et al. | 370/329 |
| 6,374,112 B1 | 4/2002 | Widegren et al. | |
| 6,603,753 B1 * | 8/2003 | Bedekar et al. | 370/335 |
| 7,145,896 B1 * | 12/2006 | Sebire | 370/349 |
| 2002/0003783 A1 | 1/2002 | Niemela et al. | |
| 2004/0100920 A1 | 5/2004 | Ball et al. | |

FOREIGN PATENT DOCUMENTS

| | | |
|---|---|---|
| DE | 100 29 427 A1 | 12/2001 |
| DE | 100 63 679 A1 | 11/2002 |
| EP | 1 154 663 A1 | 11/2001 |
| WO | WO99/60796 | 11/1999 |

* cited by examiner

*Primary Examiner*—Danh C Le
(74) *Attorney, Agent, or Firm*—Staas & Halsey LLP

(57) ABSTRACT

Resources which are to be related to a first interface between a terminal and a first network node and to a second interface between the first network node and a second network node are jointly determined during the allocation of radio technical resources for data transmission for a subscriber. Throughput and transmission characteristics of the first interface requested by a subscriber are taken into account and coherence of the resources which are to be allocated to the first interface and the resources which are to be allocated to the second interface is taken into account. Allocations of other subscribers are considered and the value to all subscribers is optimized.

6 Claims, 2 Drawing Sheets

METHOD FOR ALLOCATING RADIO TECHNICAL RESOURCES FOR DATA TRANSMISSION IN A RADIO COMMUNICATION NETWORK

CROSS REFERENCE TO RELATED APPLICATIONS

This application is based on and hereby claims priority to PCT Application No. PCT/EP2004/000466 filed Jan. 21, 2004, European Application No. 03004530.6 filed Feb. 28, 2003 and German Application No.103 08 976.4 filed Feb. 28, 2003, the contents of which are hereby incorporated by reference.

BACKGROUND OF THE INVENTION

Radio communication systems are used for transmission of information, voice or data with the aid of electromagnetic waves over a radio interface, also called an air interface, between a sending and a receiving radio station. An example of a radio communication system is the known GSM mobile radio system as well as its further development with the packet data service GPRS or EDGE, of which the network architecture is described for example in B. Walke, Mobilfunknetze und ihre Protokolle (Mobile Radio Networks and their Protocols), Volume 1, Teubner-Verlag Stuttgart, 1998, Pages 138 to 151 and Pages 295 to 311. In this case a channel formed from a narrowband frequency range and a time slot is provided in each case for transmission of a subscriber signal. Since a subscriber signal in a channel differs in frequency and time from the remaining subscriber signals, the radio station can detect the data of the subscriber signal. In new radio communication systems, for example the UMTS system, the individual subscribers are additionally differentiated by different spread codes.

With packet-switched data transmission the data is transmitted for a number of subscribers over one and the same physical channel. In the GPRS or EDGE systems which are currently the norm a number, for example six, physical channels, which are designated as packet data channels, are provided for packet switched data transmission. Each subscriber can in these systems also occupy a number of these packet data channels simultaneously (multislot). Depending on the subscriber, a packet data flow (Temporary Block Flow TBF) is broken down in such cases into time-limited radio blocks which are transmitted. In this case different modulation/coding schemes are applied to give error protection. The possible modulation/coding schemes differ as regards the subdivision of the radio block into useful load and error-protection information. Depending on the modulation/coding scheme set, these radio blocks have a different useful load but the same length. Depending on the radio conditions a connection is assigned a modulation/coding scheme with greater or lower error protection. If radio conditions are bad, a modulation/coding scheme with a greater level of protection against errors and if conditions are good a modulation/coding scheme with a lower level of error protection is assigned. Since the proportion of the useful load differs depending on the modulation/coding scheme used, the data rates which can be achieved also differ.

For packet data switching a radio communication system for example comprises a GSM mobile radio network with GPRS, a multiplicity of Serving GPRS Support Nodes (SGSN) which are internetworked and which establish the access to a fixed data network. The Serving GPRS Support Nodes are further connected to Base Station Controllers (BSC). Each Base Station Controller in its turn makes possible at least one connection to at least one Base Station (BTS) and handles the administration of the technical resources of the base stations connected to it. For administration of the radio technical resources for packet switched data transmission the base station controller includes a Packet Control Unit (PCU). A base station is a transceiver unit which can establish a communication link to a mobile station over a radio interface. The individual subscribers are allocated on a channel for packet-switched data transmission via the packet control unit.

After the data arrives in the packet control unit PCU this is transmitted via what is referred to as the Abis interface to the base station, encoded there and sent over the air interface to the mobile station. The Abis interface is a PCM30 connection with a data rate of 64 Kbit/s, which is divided up into four subchannels each of 16 Kbit/s. Thus one constant-length data packet per time slot is transmitted on the Abis interface. Since, depending on the modulation/coding scheme used, different useful data rates are available to a user on the radio interface, a different quantity of time slots is required on the Abis interface for the further transmission of this data, depending on the modulation/coding scheme used. So that a subscriber who obtains a high data rate via the radio interface can use this high data rate, it must therefore be possible at the Abis interface to allocate a sufficient quantity of time slots accordingly. One option for avoiding a bottleneck when undertaking this allocation is to design the Abis interface so that for each subscriber, independent of the modulation/coding scheme actually used, the number of time slots required for the highest data rate is reserved. This leads to inefficient utilization of the line capacity however.

An arrangement of transmission channels of an Abis interface in a cellular radio network is known from US 2002/0003783 A1. In this patent publication, a prespecified number of transmission channels is permanently allocated to operations and signaling on a base-station-specific basis. A required number of transmission channels is allocated dynamically to a packet data transmission, with a quantity of packet data being varied depending on a modulation and with a coding scheme of a Um interface.

The underlying problem is thus that of finding a method for allocating radio technical resources for packet-switched data transmission in which on the one hand satisfactory data rates are guaranteed for all subscribers and on the other hand the available infrastructure resources can be used effectively.

SUMMARY OF THE INVENTION

In the method resources to be allocated to a subscriber are determined jointly on a first interface between a station and a first network node and on a second interface between the first network node and a second network node. When this is done both a data rate and transmission characteristics of the first interface required by the subscriber and a first network node and on a second interface between the first network node and a second network node. When this is done both a data rate and transmission characteristics of the first interface required by the subscriber and also a relationship between resources to be allocated at the first interface and resources to be allocated at the second interface are taken into account. The method also takes account of the resources already allocated to other subscribers. Finally the benefit for all subscribers is optimized. Since in the method the resource at the first interface and at the second interface are allocated jointly and the method takes into account the relationship between the resources required at the first interface and those required at the second interface, and simultaneously the benefit to all subscribers is optimized, on the one hand a satisfactory data rate for all subscribers is guaranteed and on the other hand the available infrastructure resources are utilized effectively. The fact that existing allocations to other subscribers are taken into account has a beneficial effect on the computing time and processor power needed for the allocation.

According to a preferred embodiment the first interface is embodied as a radio interface between a mobile station and a network-side radio station which forms the first network node. At the first interface packet data channels and modulation and coding schemes are allocated. At the second interface one or more time slots are allocated, with the number of time slots allocated depending on the data rate implemented at the first interface. The data rate implemented at the first interface depends on the allocated coding scheme and the transmission characteristics of the first interface. This embodiment of the method is suitable for the allocation of resources on the radio interface between mobile station and base station and at the $A_{bis}$ interface between base station and base station controller in a GSM/GPRS/EDGE system.

The allocation of elements on the packet data channels preferably takes account of the number of channels on which the station can simultaneously transmit or receive respectively. The determination of the elements to be allocated on the packet data channels only looks at elements on at the most the number of packet data channels which corresponds to the number of channels on which the station can simultaneously transmit or receive. This excludes in advance allocation options which the station can in any event not use. Computing time is thus saved.

Preferably the quotient of actual data rate and data rate requested by the subscriber is defined as the value to a subscriber. The minimum of the quotients of the actual data rate and the data rate requested by the subscriber is then defined as the value to all subscribers. Preferably the value to all subscribers is optimized in the sense of maximizing the value to all subscribers. This means that the smallest quotient is maximized for a subscriber from the actual data rate and the data rate requested by the subscriber. This ensures that all subscribers involved receive the same proportion of the data rate which they have requested.

If a minimum data rate is specified for a subscriber which is not to be undershot for data transmission from and to the subscriber, it is within the scope of the invention to take into account this minimum data rate for this subscriber as a peripheral condition when optimizing the value to all subscribers. This ensures that this subscriber receives the minimum data rate required for their service to function even at high traffic volumes.

It falls within the scope of the invention to check for the subscriber the number of packet data channels onto which the elements to be allocated are distributed. For all plausible combinations of contiguous packet data channels which correspond to the number determined, an allocation is then investigated for the subscriber and the value to all subscribers is determined. The subscriber is subsequently allocated the combination of contiguous packet data channels for which the greatest value to all subscribers is produced. The value to all subscribers can be determined in exact mathematical terms by linear optimization for example. This procedure combines a mathematically exact solution of the allocation problem with a heuristic approach for the probable best allocation of time slots at the second radio interface.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
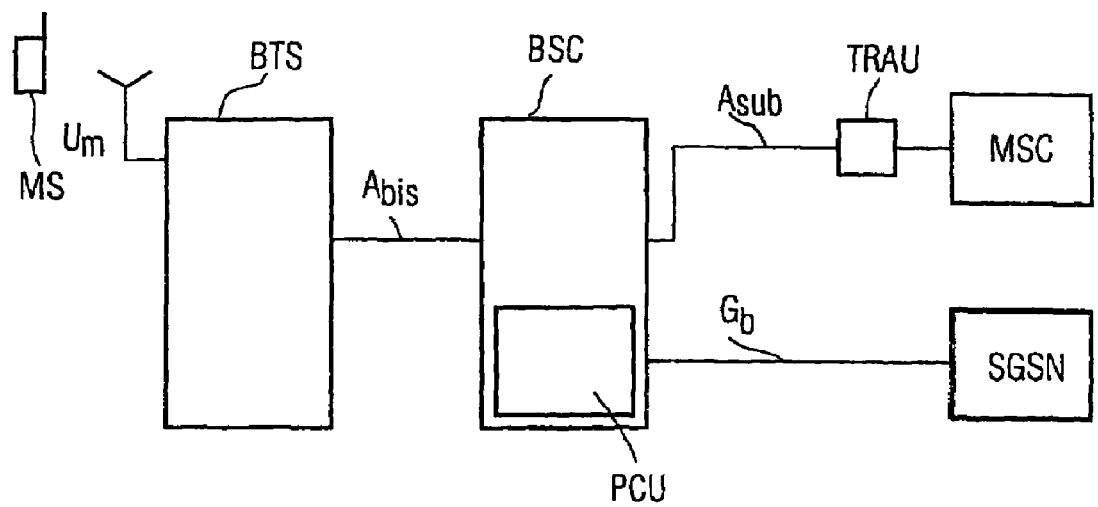
FIG. 1 shows a section of the architecture of a GSM/GPRS/EDGE system.

Reference will now be made in detail to the preferred embodiments of the present invention, examples of which are illustrated in the accompanying drawings, wherein like reference numerals refer to like elements throughout.

A radio communication system (see FIG. 1) comprises a plurality of base stations BTS via which a radio connection can be established over a radio interface $U_m$ to a mobile station MS. The base station BTS is connected via an $A_{bis}$ interface to a base station controller BSC. The base station controller BSC is connected via an $A_{sub}$ interface to a Transcoding and Rate Adapting Unit TRAU which is connected via an interface to a Mobile Switching Center MSC. The Mobile Switching Center MSC represents the connection to other networks, for example to the fixed network. Circuit-switched data is transmitted via the $A_{bis}$ interface, the $A_{sub}$ interface and the A interface.

In the base station subsystem BSS, comprising base station BTS and base station controller BSC there is a packet control unit PCU, which can for example be accommodated in the base station controller BSC. The packet control unit PCU is responsible for the determination of packet-switched data and on the one side is connected via the $A_{bis}$ interface to the base station and on the other side for example is connected via a $G_b$ interface with a Serving GPRS Support Node SGSN via which a connection is implemented to a packet data network, for example the IP network. At the radio interface $U_m$ packet data channels PDCH are set up via which a packet-switched data transmission is implemented. Different modulation and coding schemes are available for packet-switched data transmission in the GPRS system and in the EDGE system which differ as to the error protection that they provide. Modulation/coding schemes which guarantee a high level of error protection are linked to a low data transmission rate, modulation/coding schemes which offer a low level of data protection are linked to a higher data transmission rate. Depending on the transmission conditions on the air interface and the requirements of a subscriber with regard to data rate, a connection is assigned an appropriate modulation/coding scheme by the packet control unit PCU. The actual data date achieved depends on the one hand on the modulation/coding scheme used and on the other hand on the number of retransmissions required (retransmission rate) and is determined with reference to a radio planning table or measurements respectively.

In an exemplary embodiment there is a number of packet data channels K, on which N packet-switched data transmissions of N subscribers are to be allocated. Each packet data channel can in this case be assigned to more than one subscriber, however to no more than a maximum number $N_{max}$. In the GSM system up to 16 subscribers can be allocated on a packet data channel. It thus follows that $1 <= N_{max} <= 16$.

In this case a subscriber can be allocated elements on more than one packet data channel, if the subscriber's mobile station is capable of transmitting or receiving on a number of channels simultaneously. This characteristic is known as multislot capability. In today's GSM systems it is usual that in this case the subscriber will be assigned elements on contiguous channels, which means channels with consecutive numbering.

On connection setup a subscriber i requests a target data rate $R_i^*$ which is to be achieved where possible. Further the subscriber i specifies a minimum data rate $R_i^{min}$ which is not to be undershot for data transmission. Examples of this are video streams for which a transmission is no longer sensible if a minimum rate cannot be guaranteed. In actual fact the subscriber receives the data rate $R_i$, which depends on the transmission characteristics of the radio channel, the load on the network and the resources allocated to the subscriber. The physical propagation conditions such as for example the distance between the mobile station and the base station, shadowing effects or the interference situation and the applicable modulation/coding schemes are included in these calculations. The data rate which a subscriber i can obtain if he was able to use one physical channel exclusively, is expressed by $S_i^C$ and depends on the modulation/coding scheme C applied $$\{S_i^C: C=MCS\text{-}1, \ldots, MCS\text{-}9\}.$$

the data rate $R_i$ actually achieved thus depends on the assigned modulation/coding scheme C. It further depends on the proportion $p_{i,j}$ which the subscriber i receives on the channel j as a result of the allocation. The following applies here $$0 \le p_{i,j} \le 1, (1 \le i \le N, 1 \le j \le K)$$

$$\sum_{j=1}^{K} p_{i,j} = 1.$$

$$(p_{i,j} > 0)$$

which means that the subscriber i has been given a proportion $p_{i,j}$ on the packet data channel j.

for a given modulation/coding scheme C and the variables $S^C$ and $p_{i,j}$, the actual data rate for the the subscriber i is $$R_i = \sum_{j=1}^{K} S_i^C p_{i,j}$$

Depending on the load on the system and radio field conditions, the actual data rate becomes $R_i$ greater than, the same or less than the target data rate requested by the subscriber i $R_i^*$. A measure for the satisfaction of the subscriber i is the value $U_i$ to the subscriber i, which is defined as follows:

$$U_i := \frac{R_i}{R_i^*}$$

With the method for allocating resources the allocation matrix $(p_{i,j})$ is determined which optimizes the value $U_i$ for all $$i \in \{1, \ldots, N\}.$$

Since it is not possible to increase the value $U_i$ for one subscriber i without reducing the value $U_k$ for all other subscriber k, the value for all subscribers is defined and this is optimized. The value U for all subscribers is defined as follows $$U=F(U_1, \ldots, U_N):=\text{Min}\{U_1, \ldots, U_N\}.$$

When the value is optimized for all subscribers U the value of that subscriber i with the smallest value $U_i$ is thus maximized. This takes account of the fact that the requested target data rate of the individual subscribers is different. Expressed mathematically this means: Maximize the function $$(p_{i,j}) \to \text{Min}\{U_1(p_{i,j}), \ldots, U_N(p_{i,j})\}, \text{ i.e. } \text{Max}_P\{\text{Min}\{U_1(P), \ldots, U_N(P)\}\}$$

with the peripheral conditions $$\sum_{j=1}^{K} p_{i,j} = 1, \text{ for all channels } <j>$$

$$0 \le p_{i,j} \le 1$$

$$R_i \ge R_i^{min} \text{ for all subscribers } 1 <= i <= N.$$

The value V of the optimum allocation matrix $(p_{i,j})$ is defined as follows $$V := \text{Max}_P^{\text{Min}}\{U_1, \cdots, U_N\}.$$

Provided the following applies for all subscribers i $$R_i \ge R_i^{min}$$

then $$U_1=U_2=\ldots=U_N.$$

applies.

When the allocation matrix is determined the following additional peripheral conditions must be taken into account: The number of time slots on which the mobile station can send or can receive, is as a rule smaller than the number k of the packet data channels PDCH. Furthermore one and the same packet data channel PDCH can only be allocated to a limited number Nmax of subscribers. Finally only a limited number of time slots is available on the $A_{bis}$ interface, so that possibly not every modulation/coding scheme can be employed. The applicable modulation/coding schemes depend on the current allocation of the $A_{bis}$ time slots to the packet data channels and of the number of currently unused $A_{bis}$ channels.

The problem of the maximum number $N_{max}$ of subscribers to which one and the same packet data channel can be assigned is resolved by introducing a new peripheral condition for $p_{i,j}$:

$$p_{i,j} \geq \frac{1}{N_{\max}}$$

if N subscribers are already allocated on the available packet data channels PDCH and if a new connection is to be set up for a new subscriber N+1, it is first ensured by the corresponding peripheral conditions that the subscribers already allocated retain their current allocation to the packet data channels. Should a subscriber i be allocated to the packet data channels $(j_1, \ldots \text{ to } j_M)$ then $$p_{i,j} \leq 0$$

is recorded for $$j \in \{j_1, \ldots, j_M\}$$

In the search for packet data channels for the new subscriber N+1

$$p_{N+1,j} \leq 0$$

is recorded for all $$j \in \{j_1, \ldots, j_M\}$$

in order to prevent subscriber N+1 being allocated on another packet data channel.

Allocations which appear to be sensible are searched for. Allocations which appear to be sensible are seen as combinations of packet data channels for which the number corresponds to the time slot capability of the mobile station and are arranged on consecutive packet data channels. If the number k of the packet data channels is 6, the time slot capability of the mobile station is 4, this produces only the three alternatives {0,1,2,3}, {1,2,3,4}, {2,3,4,5}. The allocation is computed for these three alternatives. Subsequently the largest is selected from the values V of the allocation matrix produced. With this method of operation it may be that an allocation which would be connected with a greater redistribution of the channels and possibly represents the real optimum is not found. For this the number of linear optimizations which has to be calculated is limited in this way. This saves on processor power.

As a result the allocation matrix $(p_{i,j})$, the number of assigned $A_{bis}$ channels $(A_j)$ and the selected modulation/coding scheme CS is determined for the subscriber N+1.

To prepare for the task of optimization, the best available modulation/coding scheme CS must be calculated, starting from the number of available $A_{bis}$ channels and the vector $S^C$. This involves that modulation/coding scheme with the greatest data rate, for which sufficient $A_{to}$ channels are already assigned corresponding packet data channels or for which sufficient $A_{bis}$ channels are freely available. For the given modulation/coding scheme the matrices and vectors are then constructed which are input variables for the linear optimization.

With this preparation a decision has already been taken as to which $A_{bis}$ channels and which modulation/coding scheme is to be allocated. By linear optimization the optimum allocation $(p_{i,j})$ and its value V is determined.

This selects the best option from the previously selected assignment options of the $A_{bis}$ channels and of the modulation/coding scheme.

In the method the allocation of subscribers to their packet data channels is retained. The share of the relevant subscriber in the respective channel can however change for each allocation. This retains the quality of service requirements of the users already allocated.

If a subscriber ends their connection, the allocations of the resources for the remaining users are recalculated. The method then has the effect of having the same packet data channels still assigned to the remaining users. Should this mean that packet data channels become empty, a heuristic can be used to change a part of the allocations.

If the radio circumstances change markedly for already allocated users, the shared allocation should be recalculated. The same applies if $A_{bis}$ channels become free.

In an exemplary embodiment a transceiver unit of a base station with 6 packet data channels {0,1,2,3,4,5} is examined. To begin with all packet data channels are empty. It is assumed that the maximum number of subscribers to which a packet data channel can be assigned, is 8. This means that the lower limit for the proportions is $(p_{i,j})$ ⅛, if the subscriber i is allocated on the packet data channel j. It is assumed that 26 $A_{bis}$ channels are available on the $A_{bis}$ interface. None of the $A_{bis}$ channels is allocated.

The exemplary embodiment looks at the consecutive arrival of subscribers 1, 2 and 3. The characteristics of subscribers 1, 2 and 3 are shown in Table 1.

|  | Subscriber 1 | Subscriber 2 | Subscriber 3 |  |
|---|---|---|---|---|
| Carrier/Interferer ratio C/I | 15 dB | 20 dB | 30 dB |  |
| Data rate for the modulation/coding scheme | $S^C$ | $S^C$ | $S^C$ | #$A_{bis}$ TS per PDCH |
| MCS-1 | 8.4 Kbit/s | 8.8 Kbit/s | 8.8 Kbit/s | 1 |
| MCS-2 | 10.6 | 11.1 | 11.2 | 2 |
| MCS-3 | 13.7 | 14.6 | 14.8 | 2 |
| MCS-4 | 15.4 | 17.0 | 17.6 | 2 |
| MCS-5 | 18.1 | 21.6 | 22.4 | 2 |
| MCS-6 | 24.5 | 27.2 | 29.6 | 3 |
| MCS-7 | 24.3 | 35.9 | 44.5 | 4 |
| MCS-8 | 22.6 | 39.7 | 53.6 | 5 |
| MCS-9 | 19.2 | 38.2 | 57.6 | 5 |
| Mobile Time Slot Capability | 4 time slots | 3 time slots | 4 time slots |  |
| Target data rate | 64 Kbit/s | 111 Kbit/s | 80 Kbit/s |  |
| Minimum data rate | 16 Kbit/s | 32 Kbit/s | 16 Kbit/s |  |

The carrier/interferer ratio, that data rates for the default modulation/coding scheme, the capability of the mobile station simultaneously to transmit and receive on different time slots, i.e. the mobile time slot capability, the target data rate and the minimum data rate are specified in the table. In addition the number of $A_{bis}$ channels per packet data channel $A_{bis}$ TS per TDCH is specified for the different modulation/coding schemes.

From this data the list $$\{S^C: C=MCS\text{-}1, \ldots, MCS\text{-}9\}$$

is generated for preparation which specifies which data rates the subscriber can expect on each of the packet data channels, if only the subscriber is allocated on these packet data channels.

Figure 2:
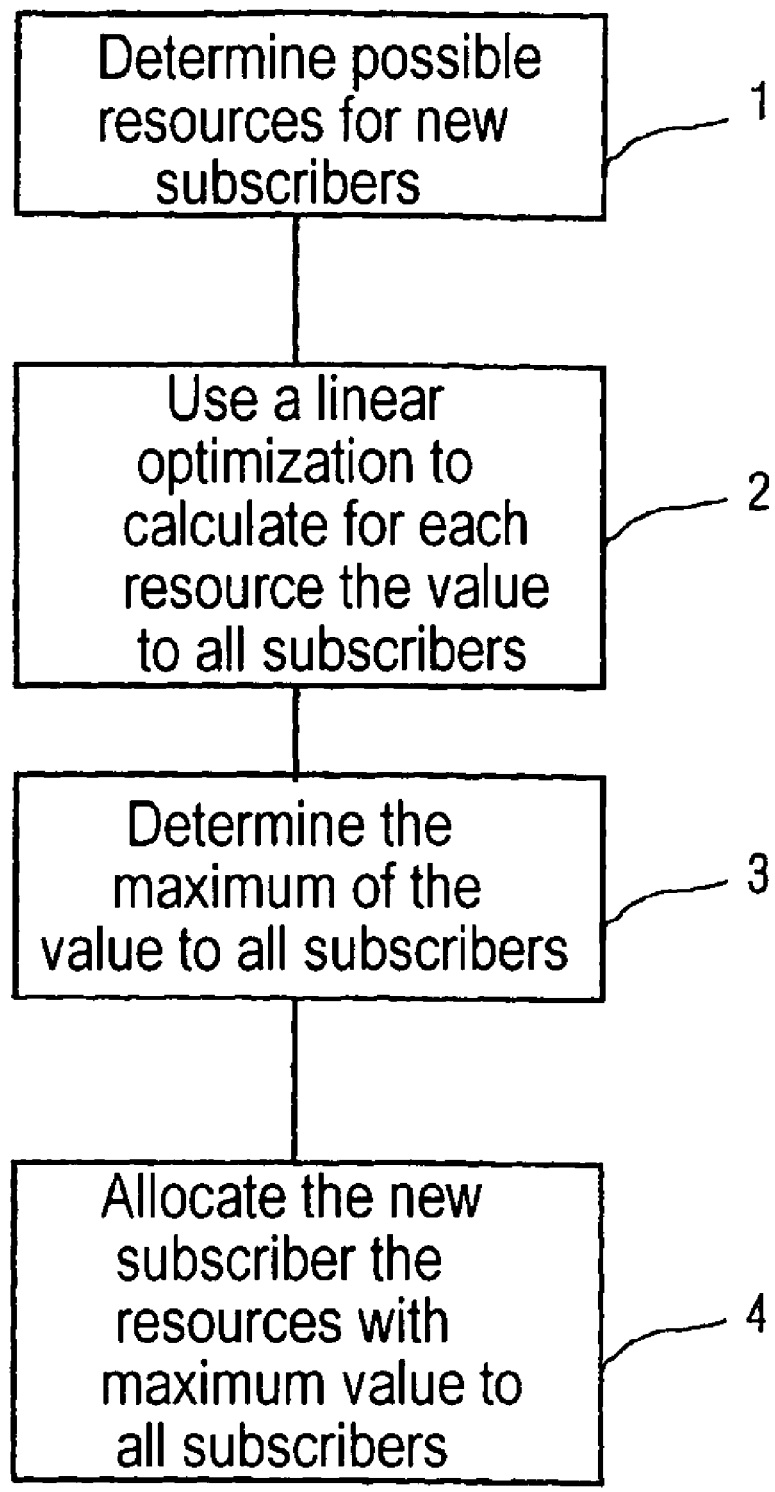
FIG. 2 shows a flowchart for allocating resources to a new subscriber.

When subscriber 1 arrives the possible resources which are available are checked (see FIG. 2, step 1). The best modulation and coding scheme for subscriber 1 is MCS-6. This allows subscriber 1 to achieve up to 24.5 Kbits on each of the packet data channels. Subscriber number 1 is allocated to the packet data channels {0,1,2,3}. For each of the packet data channels 3 $A_{bis}$ channels are needed. For the allocation matrix P this produces $$P = [1.0\ 1.0\ 1.0\ 1.0\ 0.0\ 0.0].$$

for the $A_{bis}$ allocation vector this produces $$A = [3\ 3\ 3\ 3\ 0\ 0].$$

For subscriber 1 12 $A_{bis}$ channels are now occupied. This means that 26−12=14 $A_{bis}$ channels are left.

Subsequently a connection is established for subscriber 2. For subscriber 2 MSC-8 is the modulation/coding scheme in which the highest data rate of 39.7 Kbits can be achieved on each packet data channel, if subscriber 2 does not have to share the packet data channels with other users.

Modulation/coding scheme MCS-8 needs 5 $A_{bis}$ channels for each packet data channel. This produces four alternatives for allocation of subscriber 2. Sufficient $A_{bis}$ channels are available to enable the best modulation/encryption scheme to be allocated to subscriber 2.

Alternative 1: Allocation of subscriber 2 to the packet data channels {0,1,2}. The following allocation matrices P1 and $A_{bis}$ vectors $A_l$ with the value $V_1$ are produced $$P_1 = \begin{bmatrix} 0.31 & 0.31 & 0.31 & 1.0 & 0.0 & 0.0 \\ 0.69 & 0.69 & 0.69 & 0.0 & 0.0 & 0.0 \end{bmatrix}$$

$$A_1 = [\ 3+2\ \ 3+2\ \ 3+2\ \ 3\ \ 0\ \ 0\ ]$$

$$V1 = \max\min\{U1, U2\} = 0.7369$$

For this allocation for each of the packet data channels {0,1,2} 2 additional $A_{bis}$ channels are needed. This means that there are free $A_{bis}$ channels left: 14−6=8.

Alternative 2: Allocation of subscriber 2 to the packet data channels {2,2,2,3}. This produces $$P_2 = \begin{bmatrix} 1.0 & 0.31 & 0.31 & 0.31 & 0.0 & 0.0 \\ 0.0 & 0.69 & 0.69 & 0.69 & 0.0 & 0.0 \end{bmatrix}$$

$$A_2 = [\ 3\ \ 3+2\ \ 3+2\ \ 3+2\ \ 0\ \ 0\ ]$$

$$V2 = \max\min\{U1, U2\} = 0.7369$$

In this case too two additional $A_{bis}$ channels must be used for the packet data channels {1,2,3} in each case. 14−6=8 unused $A_{bis}$ channels are thus left.

Alternative 3: Allocation of subscriber 2 to the packet data channels {2,3,4}. This produces $$P_3 = \begin{bmatrix} 1.0 & 1.0 & 0.21 & 0.21 & 0.0 & 0.0 \\ 0.0 & 0.0 & 0.79 & 0.79 & 1.0 & 0.0 \end{bmatrix}$$

$$A_3 = [\ 3\ \ 3\ \ 3+2\ \ 3+2\ \ +5\ \ 0\ ]$$

$$V3 = \max\min\{U1, U2\} = 0.9242.$$

In this case 2 additional $A_{bis}$ channels must be allocated in each case for the packet data channels {2,3}, 5 additional $A_{bis}$ channels must be assigned for packet data channel 4.

For the remaining $A_{bis}$-channels this produces 14−9=5.

Alternative 4: Allocation of subscriber 2 to the packet data channels {3,4,5}. This produces $$P_4 = \begin{bmatrix} 1.0 & 1.0 & 1.0 & 0.125 & 0.0 & 0.0 \\ 0.0 & 0.0 & 0.0 & 0.875 & 1.0 & 1.0 \end{bmatrix}$$

$$A_4 = [\ 3\ \ 3\ \ 3\ \ 3+2\ \ +5\ \ +5\ ]$$

$$V4 = \max\min\{U1, U2\} = 1.0281.$$

In this case two additional $A_{bis}$ channels must be allocated to packet data channel 3 and 5 $A_{bis}$ channels allocated to packet data channel {4,5} in each case. Therefore 14−12=2 free $A_{bis}$ channels are left.

For each of the alternatives the value $V_i$, i=1,2,3,4 is calculated with the aid of linear optimization (see step 2 in FIG. 2). The maximum is determined which is achieved with alternative 4 (see step 3 in FIG. 2). Thus subscriber 2 is allocated the resources corresponding to alternative 4 (see step 4 in FIG. 2).

Subsequently a further connection is set up for subscriber 3. The Initial situation is that only two free $A_{bis}$ channels are still available. For subscriber 3 the best modulation/coding scheme would be MCS-9, with which a maximum data rate of 57.6 Kbit/s can be achieved. Because of the occupancy of the $A_{bis}$ channels subscriber 3 can only be given the modulation/coding scheme MCS-9 on the packet data channels {2,3,4,5}. For an allocation to the packet data channels {1,2,3,4} only the use of the modulation/coding scheme MCS-7 or smaller coding schemes is possible, in which 4 $A_{bis}$ channels are required for each packet data channel. For an allocation to the packet data channels {0,1,2,3} only the use of the modulation/coding scheme MCS-6 and smaller coding schemes is possible, since when MCS-8 is used only 3 $A_{bis}$ channels per packet data channel are required.

Subsequently, for the allocation alternatives found the allocation matrix $P_i$, of the $A_{bis}$ allocation vector $A_i$ and the value $V_i$ is determined.

Alternative 1: Allocation of subscriber 3 to the packet data channels {0,1,2,3} with the modulation/coding scheme MCS-6 leads to the following result $$P_1 = \begin{bmatrix} 0.45 & 0.45 & 0.45 & 0.56 & 0.0 & 0.0 \\ 0.0 & 0.0 & 0.0 & 0.125 & 1.0 & 1.0 \\ 0.55 & 0.55 & 0.55 & 0.315 & 0.0 & 0.0 \end{bmatrix}$$

$$A_1 = [\ 3+0\ \ 3+0\ \ 3+0\ \ 5+0\ \ 5\ \ 5\ ]$$

$$V1 = \text{Max Min}\{U1, U2, U3\} = 0.7291.$$

Since for this alternative no additional $A_{bis}$ channels have to be allocated, two unused $A_{bis}$ channels are left.

Alternative 2: Allocation of subscriber 3 to the packet data channels {3,4,7,4} with the modulation/coding scheme MCS-7 leads to the following result $$P_2 = \begin{bmatrix} 1.0 & 0.38 & 0.38 & 0.41 & 0.0 & 0.0 \\ 0.0 & 0.0 & 0.0 & 0.46 & 0.87 & 1.0 \\ 0.0 & 0.62 & 0.62 & 0.13 & 0.13 & 0.0 \end{bmatrix}$$

$$A_2 = [\ 3\ \ 3+1\ \ 3+1\ \ 5+0\ \ 5+0\ \ 5\ ]$$

-continued $$V2 = \text{Max Min}\{U1, U2, U3\} = 0.8325.$$

For this alternative one additional $A_{bis}$ channel is needed for each of packet data channels 1 and 2. This means that there are no unused $A_{bis}$ channels left.

Alternative 3: Allocation of subscriber 3 to the packet data channels {4,5,4,5} with the modulation/coding scheme MCS-9. This produces the following result $$P_3 = \begin{bmatrix} 1.0 & 1.0 & 0.17 & 0.14 & 0.0 & 0.0 \\ 0.0 & 0.0 & 0.0 & 0.73 & 0.87 & 0.87 \\ 0.0 & 0.0 & 0.83 & 0.13 & 0.13 & 0.13 \end{bmatrix}$$

$$A_2 = [3 \ 3 \ 3+2 \ 5+0 \ 5+0 \ 5+0]$$

$$V3 = \text{Max Min}\{U1, U2, U3\} = 0.8833.$$

For this alternative packet data channel 2 must be assigned two further $A_{bis}$ channels. This means that there are no unused $A_{bis}$ channels left.

Subsequently the maximum of the values $V_i$, i=1,2,3, is determined. V3 is the largest value, so that an allocation of the resources for subscriber 3 corresponding to alternative 3 is then undertaken.

On connection cleardown of subscriber 1 the matrix p is recalculated. It now features only two rows, with the first row corresponding to subscriber 2 and the second row to subscriber 3. This produces the following result $$P = \begin{bmatrix} 0.0 & 0.0 & 0.0 & 0.875 & 0.875 & 0.875 \\ 0.0 & 0.0 & 1.0 & 0.125 & 0.125 & 0.125 \end{bmatrix}$$

$$A = [3-3 \ 3-3 \ 5 \ 5 \ 5 \ 5].$$

6 $A_{bis}$ channels are released. Packet data channels 0 and 1 are no longer used. Shifting of subscriber 2 to the packet data channels 0,1,2 would have to be undertaken with a heuristic method outside the described method.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

The invention claimed is:

1. A method for allocating radio technical resources for data transmission in a radio communication network, comprising:
    allocating resources to a subscriber by jointly considering allocation conditions at first and second interfaces, the first interface being between a subscriber station and a first network node and the second interface being between the first network node and a second network node, the resources being allocated by:
    considering a data rate and transmission characteristics requested by the subscriber at the first interface,
    determining a value to the subscriber, the value to the subscriber being defined as the quotient from an actual data rate and the data rate requested by the subscriber;
    determining a value to all subscribers, the value to all subscribers being defined as the minimum of the quotients for all subscribers, from the actual data rate and the data rate requested by each subscriber; and
    maximizing the value to all subscribers using an optimization process.

2. The method according to claim 1, wherein
    at least a portion of the subscribers each have a minimum data rate pre-sepecified which is not to be undershot for data transmission, and
    resources are allocated such that the subscribers are each provided with at least their minimum data rate.

3. The method according to claim 1, wherein
    the first network node is a network-side radio station,
    the subscriber station is a mobile station,
    the first interface is a radio interface between the mobile station and the first network node,
    the subscriber, for transmission over the first interface, is allocated one of a plurality of coding schemes and one or more packet data channels, and
    the subscriber, for transmission over the second interface, is allocated one or more time slots, based on a relationship between the number of time slots allocated at the second interface and the coding scheme allocated at the first interface.

4. The method according to claim 3, wherein
    a check is made on the number of packet data channels allocated to the subscriber,
    for a not necessarily true subset of all combinations of contiguous packet data channels which correspond to the number of packet data channels allocated, an allocation is investigated for the subscriber and the value to all subscribers is determined, and
    the number of contiguous packet data channels allocated to the subscriber is set to the number of contiguous packet data channels that maximizes the value to all subscribers.

5. The method according to claim 3, wherein the number of data packet channels allocated to the subscriber is less than or equal to the number of packet data channels on which the subscriber station can simultaneously transmit or receive.

6. The method according to claim 5, wherein
    a check is made on the number of packet data channels allocated to the subscriber,
    for a not necessarily true subset of all combinations of contiguous packet data channels which correspond to the number of packet data channels allocated, an allocation is investigated for the subscriber and the value to all subscribers is determined, and
    the number of contiguous packet data channels allocated to the subscriber is set to the number of contiguous packet data channels that maximizes the value to all subscribers.

* * * * *